United States Patent
Cho et al.

(10) Patent No.: US 11,714,696 B2
(45) Date of Patent: Aug. 1, 2023

(54) CUSTOM BASEBOARD MANAGEMENT CONTROLLER (BMC) FIRMWARE STACK WATCHDOG SYSTEM AND METHOD

(71) Applicant: Dell Products, L.P., Round Rock, TX (US)

(72) Inventors: Eugene David Cho, Austin, TX (US); Timothy M. Lambert, Austin, TX (US); Akkiah Choudary Maddukuri, Austin, TX (US); Chandrasekhar Mugunda, Austin, TX (US); Arun Muthaiyan, Round Rock, TX (US); Sreeram Veluthakkal, Pflugerville, TX (US)

(73) Assignee: Dell Products, L.P., Round Rock, TX (US)

( * ) Notice: Subject to any disclaimer, the term of this patent is extended or adjusted under 35 U.S.C. 154(b) by 82 days.

(21) Appl. No.: 17/346,657

(22) Filed: Jun. 14, 2021

(65) Prior Publication Data

US 2022/0398144 A1    Dec. 15, 2022

(51) Int. Cl.
*G06F 11/07*    (2006.01)
*G06F 11/30*    (2006.01)
*G06F 1/20*    (2006.01)

(52) U.S. Cl.
CPC ............ *G06F 11/0757* (2013.01); *G06F 1/20* (2013.01); *G06F 11/3058* (2013.01)

(58) Field of Classification Search
CPC ..... G06F 11/0757; G06F 1/20; G06F 11/3058
See application file for complete search history.

(56) References Cited

U.S. PATENT DOCUMENTS

| | | | |
|---|---|---|---|
| 2010/0117579 A1* | 5/2010 | Culbert | G06F 1/206 318/471 |
| 2017/0322816 A1* | 11/2017 | Parthiban | G06F 9/4416 |
| 2019/0220340 A1* | 7/2019 | Chou | G06F 11/0709 |
| 2020/0089572 A1* | 3/2020 | Bodner | G06F 11/2284 |

* cited by examiner

*Primary Examiner* — Matthew M Kim
*Assistant Examiner* — Kyle Emanuele
(74) *Attorney, Agent, or Firm* — Fogarty LLP

(57) ABSTRACT

An Information Handling System (IHS) includes multiple hardware devices, and a baseboard Management Controller (BMC) in communication with the plurality of hardware devices. The BMC includes a first processor for executing a custom BMC firmware stack, and transmitting a watchdog message at an ongoing basis. The BMC also includes a second processor for receiving the watchdog message. When the watchdog message is received within a specified elapsed period of time, allow continued operation of the custom BMC firmware stack, and when not received within the specified elapsed period of time, place the BMC in a failsafe mode of operation.

20 Claims, 3 Drawing Sheets

CUSTOM BASEBOARD MANAGEMENT CONTROLLER (BMC) FIRMWARE STACK WATCHDOG SYSTEM AND METHOD

FIELD

The present disclosure generally relates to electronics, and, more particularly, to a custom baseboard management controller (BMC) firmware stack watchdog system and method.

BACKGROUND

An Information Handling System (IHS) generally refers to any computing system that processes, compiles, stores, and/or communicates information or data for business, personal, or other purposes. Modern day IHS administrative management is often provided remotely via baseboard management controllers (BMCs). The baseboard management controller (BMC) generally includes a specialized microcontroller embedded in the IHS, and may provide an interface between system-management software and platform hardware. Different types of sensors built into the IHS report to the BMC on parameters such as temperature, cooling fan speeds, power status, operating system (O/S) status, and the like. The BMC monitors the sensors and can send alerts to a system administrator via the network if any of the parameters do not stay within pre-set limits, indicating a potential failure of the system. The administrator can also remotely communicate with the BMC to take certain corrective actions, such as resetting or power cycling the system to get a hung O/S running again. These abilities can often save on the total cost of ownership of an IHS, particularly when implemented in large clusters, such as server farms.

SUMMARY

According to one embodiment, an Information Handling System (IHS) includes multiple hardware devices, and a baseboard Management Controller (BMC) in communication with the plurality of hardware devices. The BMC includes a first processor for executing a custom BMC firmware stack, and transmitting a watchdog message at an ongoing basis. The BMC also includes a second processor for receiving the watchdog message. When the watchdog message is received within a specified elapsed period of time, continued operation of the custom BMC firmware stack is allowed, and when not received within the specified elapsed period of time, the BMC is placed in a failsafe mode of operation.

According to another embodiment, a method includes the steps of executing a custom BMC firmware stack, and transmitting a watchdog message at an ongoing basis by a first processor, and receiving the watchdog message by a second processor. The method further includes the steps of allowing continued operation of the custom BMC firmware stack when the watchdog message is received within a specified elapsed period of time, and placing the BMC in a failsafe mode of operation when the watchdog message is not received within the specified elapsed period of time.

According to yet another embodiment, a baseboard Management Controller (BMC) is provided that communicates with multiple hardware devices of an Information Handling System (IHS). The BMC includes a first processor for executing a custom BMC firmware stack, and transmitting a watchdog message at an ongoing basis. The BMC also includes a second processor for receiving the watchdog message. When the watchdog message is received within a specified elapsed period of time, continued operation of the custom BMC firmware stack is allowed, and when not received within the specified elapsed period of time, the BMC is placed in a failsafe mode of operation.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
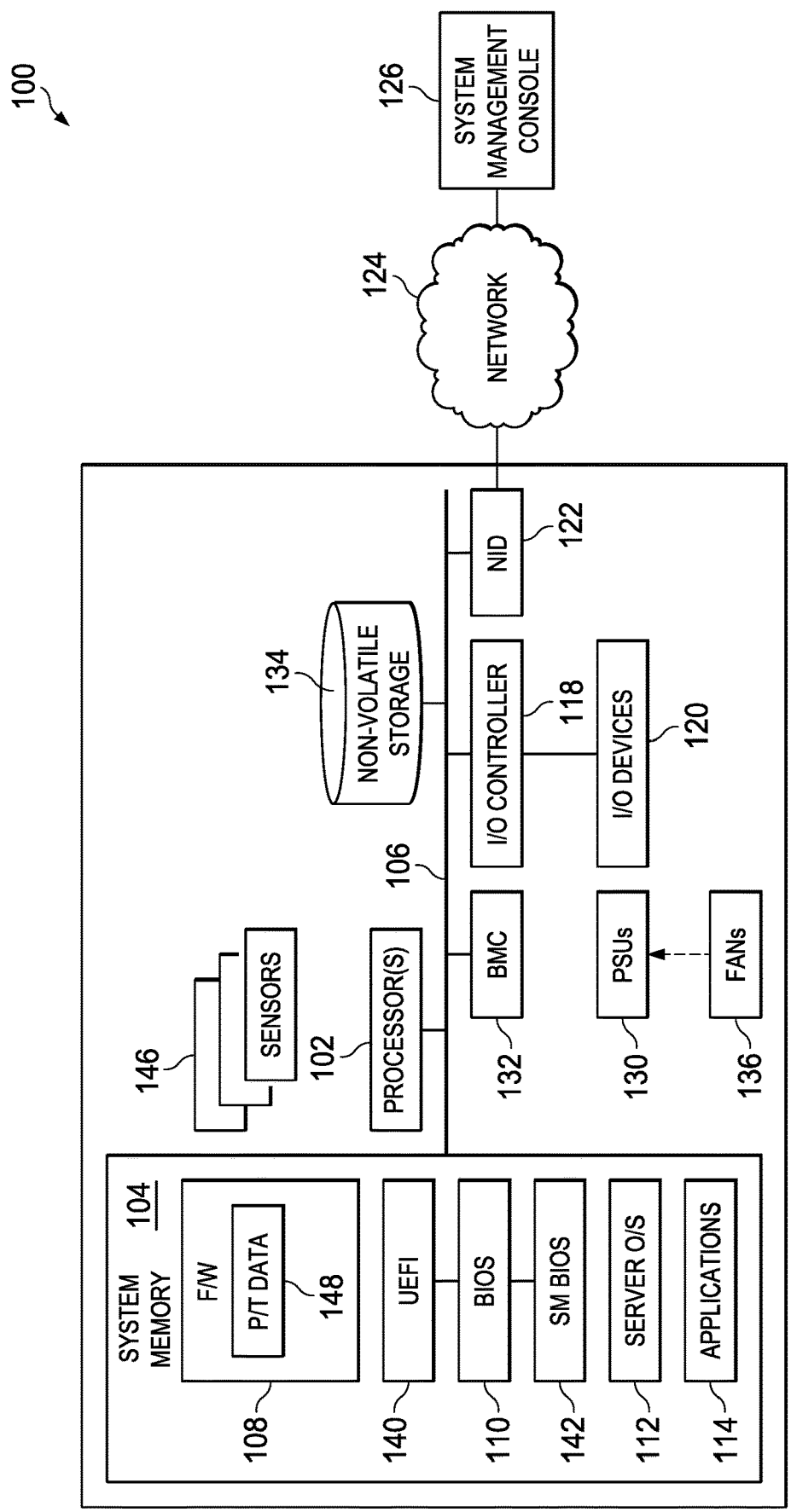
FIG. 1 is a block diagram of examples of components of an Information Handling System (IHS), according to some embodiments.

Embodiments described herein comprise systems and methods for monitoring baseboard management controllers (BMCs) that are installed with custom BMC firmware stacks. Whereas the development of custom BMC firmware stacks is performed in an inherently uncontrolled environment, their deployment can cause certain problems, such as a condition in which the underlying information handling system (IHS) or even the BMC itself ceases to function properly (e.g., malfunction or hang). This problem can be particularly egregious in that, because the BMC possesses certain control capabilities over its underlying IHS, a frozen or hung condition of the BMC can cause damage to its respective IHS if not handled properly. Embodiments of the present disclosure provide a solution to this problem, among others, using a watchdog monitoring system and method that implements a watchdog timer so that, in the event that a custom BMC firmware stack causes the BMC to cease functioning properly due to any one of several reasons (e.g., hung processor, illicit tampering with restricted memory, etc.), a protection mechanism is activated to bring the failed BMC into a failsafe mode of operation so that any potential damage to the underlying IHS can be alleviated or reduced.

Certain IHSs may be configured with BMCs that are used to monitor, and in some cases manage computer hardware components of their respective IHSs. A BMC is normally programmed using a firmware stack that configures the BMC for performing out-of-band (e.g., external to a computer's operating system or BIOS) hardware management tasks. The BMC firmware can support industry-standard Specifications, such as the Intelligent Platform Management Interface (IPMI) and Systems Management Architecture of Server Hardware (SMASH) for computer system administration.

The BMC firmware is normally proprietary and is often developed by the vendor and shipped along with the BMC to the end user. Nevertheless, industry trends have migrated toward custom BMC firmware stacks (e.g., operating systems) that allow the end user greater control over how the BMC operates. OpenBMC is one example standard under which custom BMC firmware stacks may be generated. In general, openBMC is a collaborative open-source Linux distribution for BMCs meant to work across heterogeneous systems that include enterprise, high-performance computing (HPC), telecommunications, and cloud-scale data centers.

While custom BMC firmware stacks, such as those implemented according to openBMC standards, may provide enhanced manageability, transparency, and customization, its implementation has not been without drawbacks. For example, standard BMC firmware stacks are often implemented by the vendor of the IHS in which the BMC is deployed, such that the quality and reliability of the BMC's functionality can be controlled to a relatively good degree. One example of such a standard BMC firmware stack is the iDRAC firmware stack provided by the DELL CORPORATION.

Since custom BMC firmware stacks are developed in inherently uncontrolled environments, they may encounter a relatively greater level of software errors or faults (e.g., software bugs). This drawback can be particularly problematic when certain control functions allocated to the BMC can ruin or damage the IHSs if not properly managed. For example, whereas BMCs may be configured to control the fan speed of any of a number of fans configured in the IHS, either inadvertent or malicious algorithms within the custom BMC firmware stack can cause the fans to turn excessively slow, thus yielding an overheating condition which in turn may cause physical damage. As another example, modern day BMCs are often configured with small memory components (e.g., an electronic multimedia card (eMMC)) due to their relatively low cost and small size; nevertheless, excessive read/write cycle rates caused by custom BMC firmware stack algorithms can cause damage to these memory components. Embodiments of the present disclosure provide a custom BMC firmware stack watchdog system and method that monitors the activities of the IHS as well as a BMC deployed with a custom BMC firmware stack, and provides certain remediation operations should certain protection parameters of the IHS become excessive due to use of the custom BMC firmware stack.

A monitoring process, such as one implemented on a coprocessor of the BMC, may be used to continually monitor the operation of its main processor (e.g., baseboard processor), but should the monitoring process become compromised due to some extenuating circumstance, the BMC and its associated IHS should still be protected.

Additionally, the main processor of the BMC normally store files that may be used by other resources of the IHS, such as the BIOS resource, which may access data in BMC storage during its booting process. In such cases, unavailability of the BMC or lack of control over an untrusted custom BMC firmware stack could potentially cause loss or unpredictability of critical IHS functionality. As such, the functionality of the host IHS should not depend upon the reliability of custom BMC firmware stacks. Furthermore, in certain cases where a custom BMC firmware stack does become unresponsive, a failsafe mode should be provided in a manner that the host IHS can still function properly. It is with these concerns in mind that embodiments of the present disclosure are provided herein.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, science, control, or other purposes. For example, an IHS may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price.

The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, touchscreen and/or a video display. The IHS may also include one or more buses operable to transmit communications between the various hardware components.

FIG. 1 is a block diagram of examples of components of an Information Handling System (IHS), according to some embodiments. Particularly, IHS 100 includes one or more processor(s) 102 coupled to system memory 104 via system interconnect 106. System interconnect 106 may include any suitable system bus. System memory 104 may include a plurality of software and/or firmware modules including firmware (F/W) 108, basic input/output system (BIOS) 110, operating system (O/S) 112, and/or application(s) 114. Software and/or firmware module(s) stored within system memory 104 may be loaded into processor(s) 102 and executed during operation of IHS 100.

F/W 108 may include a power/thermal profile data table 148 that is used to store power profile data and thermal profile data for certain hardware devices (e.g., processor(s) 102, system memory 104, non-volatile storage 134, NID 122, I/O controllers 118, etc.). System memory 104 may include a UEFI interface 140 and/or a SMBIOS interface 142 for accessing the BIOS as well as updating BIOS 110. In general, UEFI interface 140 provides a software interface between an operating system and BIOS 110. In many cases, UEFI interface 140 can support remote diagnostics and repair of computers, even with no operating system installed. SMBIOS interface 142 can be used to read management information produced by BIOS 110 of an IHS 100. This feature can eliminate the need for the operating system to probe hardware directly to discover what devices are present in the computer.

IHS 100 includes one or more input/output (I/O) controllers 118 which manages the operation of one or more connected input/output (I/O) device(s) 120, such as a keyboard, mouse, touch screen, microphone, a monitor or display device, a camera, a microphone, audio speaker(s) (not shown), an optical reader, a universal serial bus (USB), a card reader, Personal Computer Memory Card International Association (PCMCIA) slot, and/or a high-definition multimedia interface (HDMI).

IHS 100 includes Network Interface Device (NID) 122. NID 122 enables IHS 100 to communicate and/or interface with other devices, services, and components that are located externally to IHS 100. These devices, services, and components, such as a system management console 126, can interface with IHS 100 via an external network, such as network 124, which may include a local area network, wide area network, personal area network, the Internet, etc.

IHS 100 further includes one or more power supply units (PSUs) 130. PSUs 130 are coupled to a BMC 132 via an I$^2$C bus. BMC 132 enables remote operation control of PSUs 130 and other components within IHS 100. PSUs 130 power the hardware devices of IHS 100 (e.g., processor(s) 102, system memory 104, non-volatile storage 134, NID 122, I/O controllers 118, PSUs 130, etc.). To assist with maintaining temperatures within specifications, an active cooling system, such as one or more fans 136 may be utilized.

IHS 100 further includes one or more sensors 146. Sensors 146 may, for instance, include a thermal sensor that is in thermal communication with certain hardware devices that generate relatively large amounts of heat, such as processors 102 or PSUs 130. Sensors 146 may also include voltage sensors that communicate signals to BMC 132 associated with, for example, an electrical voltage or current at an input line of PSU 130, and/or an electrical voltage or current at an output line of PSU 130.

BMC 132 may be configured to provide out-of-band management facilities for IHS 100. Management operations may be performed by BMC 132 even if IHS 100 is powered off, or powered down to a standby state. BMC 132 may include a processor, memory, and an out-of-band network interface separate from and physically isolated from an in-band network interface of IHS 100, and/or other embedded resources. In certain embodiments, BMC 132 may include or may be part of a Remote Access Controller (e.g., a DELL Remote Access Controller (DRAC) or an Integrated DRAC (iDRAC)). In other embodiments, BMC 132 may include or may be an integral part of a Chassis Management Controller (CMC).

Figure 2:
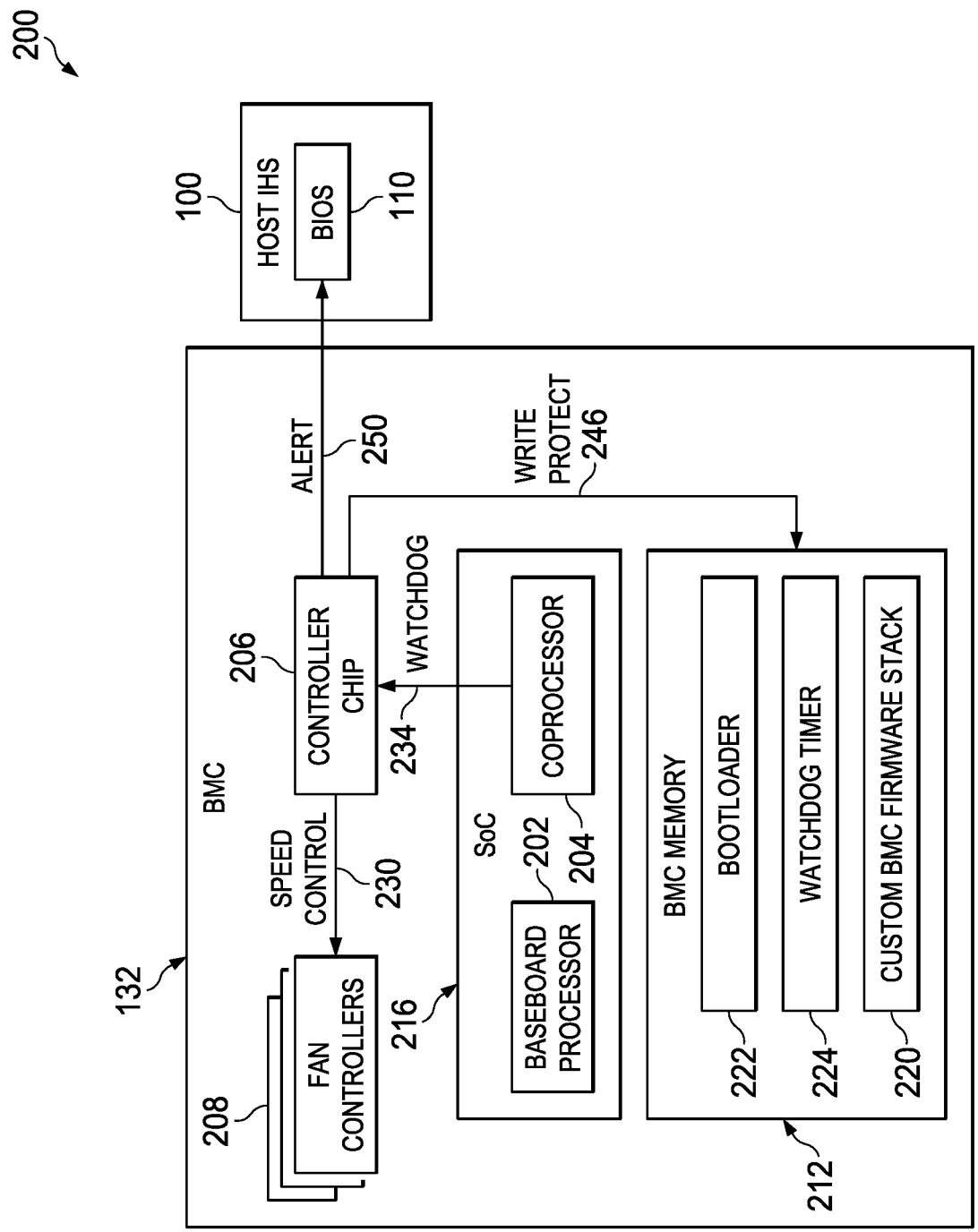
FIG. 2 illustrates several components of an example BMC along with those of an associated IHS showing how those components may signal one another for implementing the custom BMC firmware stack watchdog system according to one embodiment of the present disclosure.

FIG. 2 illustrates several components of an example BMC 132 along with those of an associated IHS 100 showing how those components may signal one another for implementing the custom BMC firmware stack watchdog system according to one embodiment of the present disclosure. BMC 132 generally includes a baseboard processor 202, a coprocessor 204, a controller chip 206, one or more fan controllers 208, and a BMC memory 212. The IHS 100 on the other hand, is shown including a BIOS 110. As shown, the baseboard processor 202 and coprocessor 204 may be provided together in a system on chip (SoC) device 216. In another embodiment, the baseboard processor 202 and coprocessor 204 may be provided as discreet entities. In yet another embodiment, the BMC 132 may include the baseboard processor 202 and be void of any coprocessor 204. The BMC 132 and IHS 100 are shown with those components described above for purposes of brevity and clarity of discussion, it should be appreciated that either of the BMC 132 and/or IHS 100 may be configured with additional, fewer, or different components without departing from the spirit and scope of the present disclosure.

The BMC memory 212 may integrally formed with the baseboard processor 202, coprocessor 204, and/or controller chip 206, or it may be discreetly separate therefrom. In one embodiment, the BMC memory 212 may be implemented on a memory device (e.g., an electronic multi media card (eMMC), an electronic universal flash storage (eUFS), or a low-power double data rate (LPDDR) memory device, etc.). The BMC memory 212 is configured to store a bootloader 222, a custom BMC firmware stack 220, and a watchdog timer 224. The bootloader 222 may include any type of executable code for launching or booting the custom BMC firmware stack 220 on the baseboard processor 202. In one embodiment, the bootloader 222 includes a Universal boot loader (Das U-Boot), which is provided under an open source license, and is primarily adapted for use in embedded processor devices to bootstrap the BMC firmware stack's operating system's kernel.

Baseboard processor 202 may include any suitable type of processor, such as an advanced RISC machine (ARM) processor. Baseboard processor 202 executes a standard BMC firmware stack (not shown) or a custom BMC firmware stack 220 that is stored in a BMC memory 212. A standard BMC firmware stack may be, for example, an IHS vendor provided firmware stack (e.g., an iDRAC provided by the DELL CORPORATION), while the custom BMC firmware stack 220 may be one created by a user of the IHS, such as one implemented using the openBMC framework. The custom BMC firmware stack 220 may provide out-of-band monitoring and management of the components of the IHS 100. Examples of monitoring functions that the custom BMC firmware stack 220 may provide include, for example, monitoring internal ambient temperatures and/or voltages in the IHS 100, along with monitoring CPU, memory, network usage levels, and the like. Examples of management features may include installation of software including the base operating system, of the IHS 100, controlling fan speed of one or more fans in the IHS 100, turning certain resources of the IHS 100 on or off, and the like.

Coprocessor 204 functions independently of baseboard processor 202 to monitor its operation. In one embodiment, the coprocessor 204 may be configured to continually monitor its executable code to ensure that it is not modified or illicitly accessed by the custom BMC firmware stack 220. For example, the coprocessor 204 may periodically perform a cyclic redundancy check (CRC) process on its executable code and compare its derived value against previously derived values to determine if any of the code has changed.

Custom BMC firmware stacks 220 are typically created by users whose development efforts are not closely controlled by the vendor of the IHS 100 and as such, it may include logic that may not be aware of all of the intricacies of the IHS 100 it is designed to manage. Thus, the watchdog timer 224 may be configured with logic for providing out-of-band monitoring of those custom BMC firmware stacks 220 so that, in the event that it causes certain conditions within the IHS 100 to become dangerous for its proper operation, the watchdog timer 224 may generate an alert and/or management signal for remediating the dangerous conditions. Throughout this disclosure, the terms 'signal' and 'message' may be used interchangeably to mean any informational mechanism transmitted from one component of the system to another. The watchdog timer 224 may, in certain cases, be considered to operate out-of-band with respect to the baseboard processor 202 because the actions of the watchdog timer 224 function independently or is not controller by those of the baseboard processor 202. Thus, the watchdog timer 224 may provide monitoring capabilities over the baseboard processor 202 regardless of what type of logic that it is implemented with.

Elements of the watchdog timer 224 may be configured to provide certain features of the custom BMC firmware stack watchdog system disclosed herein. In one embodiment, the watchdog timer 224 may transmit a watchdog message 234 to the controller chip 206 at ongoing intervals such that, if properly received, the controller chip 206 allows continued operation of the custom BMC firmware stack 220. As will be described in detail herein below, the controller chip 206 is also configured to place the BMC 132 in a failsafe mode of operation if those watchdog messages are not received in a timely manner.

In one embodiment, the watchdog timer 224 generates each watchdog message with a bitmask field populated with a numerical value that is incremented each time the watchdog message is transmitted. That is, each subsequent watchdog message will include a numerical value that is incremented from the previously transmitted watchdog message. It would be beneficial to have the memory space utilized by the coprocessor 204 be inaccessible to the custom BMC firmware stack 220 so that the coprocessor 204 may function in a supervisory role to monitor the health of the BMC 132 when the custom BMC firmware stack 220 is executed. Nevertheless, actions taken by the custom BMC firmware stack 220 may either inadvertently or maliciously co-opt the operation of the coprocessor 204 by, for example, generating spoof watchdog messages that mimic the valid watchdog messages generated by the coprocessor 204, thus negating any watchdog protection that would otherwise be provided by the coprocessor 204. By generating watchdog messages with incremented bitmask values, the controller chip 206 will be able to know whether or not any spoof watchdog message has been generated because the incremented sequence would be broken.

In another embodiment, the coprocessor 204 may transmit each watchdog message with a random time delay. For example, the coprocessor 204 may periodically transmit each successive watchdog message with an average delay of approximately 15.0 seconds with a minimum and maximum time delay that ranges from 5.0 to 25.0 seconds, respectively. That is, the coprocessor 204 may transmit each successive watchdog message at 15.0 second intervals +/−10.0 seconds in some embodiments. In other embodiments, the coprocessor 204 may generate the watchdog messages at any suitable time interval and/or with any suitable minimum or maximum time delay variation. Randomizing the interval time may aid in reducing any co-opting of the coprocessor 204 by the custom BMC firmware stack 220 because any malicious algorithms it would otherwise perform would not be able to anticipate when to send any spoof messages.

Controller chip 206 includes logic (e.g., instructions stored in a memory and executed by a processor, stateful and/or stateless logic, etc.) for controlling certain features of the IHS 100 and/or BMC 132. In one embodiment, a Complex Programmable Logic Device (CPLD) can be used to implement the controller chip. For example, the controller chip 206 may include logic for, in response to receiving certain input signals, activating or deactivating one or more signals or messages to the baseboard processor 202 and/or coprocessor 204. As another example, the controller chip 206 may include logic for disabling the baseboard processor 202 or coprocessor 204 by holding it in reset so that it cannot boot.

In one embodiment, the controller chip 206 continually verifies that the watchdog messages are properly received, and if so, allows continue operation of the BMC 132; otherwise, it places the BMC 132 in a failsafe mode of operation. The failsafe mode of operation generally refers to several control actions that are performed and/or states that certain resources may be placed in to ensure that the IHS 100 can still function without the normal services provided by the BMC 132.

In another embodiment, if the controller chip 206 performs a failsafe action of generating a BIOS alert message 250 to notify the BIOS 110 of the IHS 100 that the BMC 132 has entered the failsafe mode. When the BIOS 110 receives such a BIOS alert message 250, it may lock the bootstrap code of the BIOS 110 into a user input mode (e.g., F1/F2) so that user input (e.g., voluntary overriding) of the alert condition is required when the IHS 100 is re-started.

In another embodiment, the controller chip 206 performs failsafe actions of generating certain protection signals or messages for manipulating certain components of the IHS 100 or BMC 132. For example, the watchdog timer 224 may generate a fan control signal 230 to control the fan controllers 208 to set the fans of the IHS 100 at a maximum level to ensure the IHS 100 does not overheat. In another example, the controller chip 206 may generate a write protect signal 246 to restrict write access to the BMC memory 212. While current BMC implementations often include certain memory devices (e.g., eMMC, eUFS, LPDDR, etc.) due to their relatively small package sized, low cost, and high availability, its memory can become corrupted or even the memory device itself damaged if it is subjected to abnormal use by the custom BMC firmware stack 220, such as by performing an excessive level of write cycles (e.g., write rates) to the BMC memory 212. As such, the watchdog timer 224 may control the BMC memory 212 to restrict its ability to be written to. In some embodiments, the watchdog timer 224 may also include logic for notifying the user of such a condition, and/or selectively limiting (e.g., throttling) write cycles to the BMC memory 212 by generating a write protect message 246 to maintain a desired write cycle rate or in some cases, to disallow further write sequences to the BMC memory 212 altogether.

Figure 3:
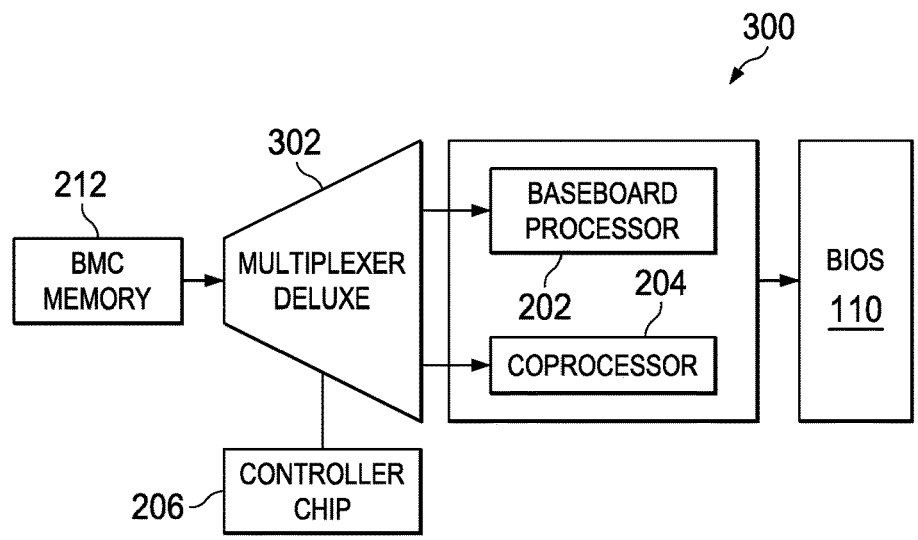
FIG. 3 illustrates an example BMC architecture showing an action that the controller chip may perform when the BMC is placed in the failsafe mode of operation according to one embodiment of the present disclosure.

FIG. 3 illustrates an example BMC architecture 300 showing an action that the controller chip 206 may perform when the BMC 132 is placed in the failsafe mode of operation according to one embodiment of the present disclosure. The BMC architecture 300 generally includes a BMC memory 212 in communication with the baseboard processor 202 and coprocessor 204 via a multiplexer device 302. According to one embodiment of the present disclosure, the multiplexer device 302 is controlled by the controller chip 206 to alternatively route stored data from the BMC memory 212 to the BIOS 110 of the IHS 100 via either the baseboard processor 202 or coprocessor 204.

During a normal mode of operation, the BIOS 110 of the IHS 100 ordinarily acquires data stored in the BMC memory 212 during its power on self test (POST) process, for example, during re-boot of the IHS 100. Nevertheless, if the BMC 132 is in the failsafe mode of operation, the baseboard processor 202 may not be available to relay such data to the BIOS 110. As such, the coprocessor 204 may be configured with logic for forwarding data, under control of the controller chip 206, from the BMC memory 212 to the BIOS 110 of the IHS 100. For example, when the BMC 132 is in the failsafe mode, the controller chip 206 may receive a request from the BIOS 110 to acquire certain elements of data (e.g., IHS resource inventory, resource functional status, stored resource operating parameters, etc.) from the BMC memory 212 during its POST sequence. The controller chip 206 may then control the multiplexer device 302 to route the requested data through the coprocessor 204 to the BIOS 110. Nevertheless, in other embodiments it is contemplated that the coprocessor 204 may be configured to receive and process the requests for data from the BMC memory 212 from other resources of the IHS 100 without departing from the spirit and scope of the present disclosure.

Such an operation would be agnostic to the BIOS 110. That is, the BIOS 110 is essentially unaware of how its requested data is received, its only concern is that the data is reliably accessed from the BMC memory 212. Thus, while in the failsafe mode of operation, routing data from the BMC memory 212 to the BIOS 110, or other resource of the IHS 100, may be performed without any significant changes to how the BIOS 110 or other resource of the IHS 100 accesses data from the BMC memory 212.

While the BMC architecture 300 shown herein is included with a multiplexer device 302 for alternatively routing data between the baseboard processor 202 and coprocessor 204, it is contemplated those other architectures may be implemented for providing at least partially similar results. For example, the controller chip 206 may include logic for disabling the baseboard processor 202 (e.g., holding the baseboard processor 202 in a reset condition), and activating certain algorithms in the coprocessor 204 to respond to requests from other resources in the IHS 100 to retrieve the requested data from the BMC memory 212, and transmit that data to the requesting resource.

Figure 4:
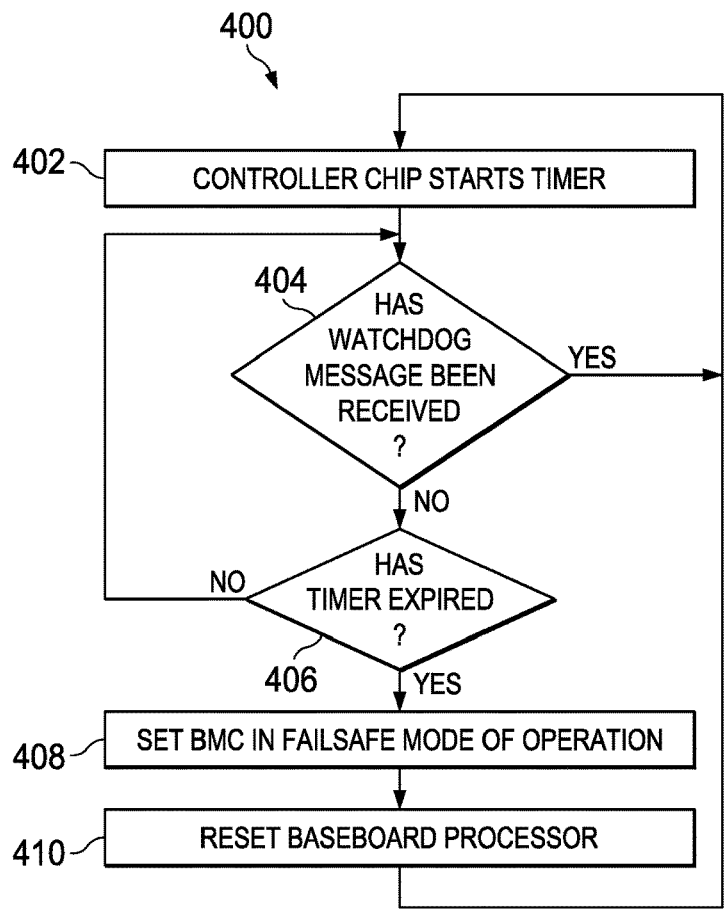
FIG. 4 illustrates an example custom BMC firmware stack watchdog method that may be performed to monitor the operation of a custom BMC firmware stack according to one embodiment of the present disclosure.

FIG. 4 illustrates an example custom BMC firmware stack watchdog method 400 that may be performed to monitor the operation of a custom BMC firmware stack 220 according to one embodiment of the present disclosure. In one embodiment, the method 400 may be performed when a custom BMC firmware stack 220 is loaded and executed by the baseboard processor 202. In another embodiment, the method 400 may be performed each time the BMC 132 is booted to continually monitor the activities of the custom BMC firmware stack 220.

Initially after the BMC 132 has been started (e.g., initial power on, re-boot, etc.) at step 402, the controller chip 206 initializes its timer to commence the watchdog process. The timer may be set to any suitable scalar value that provides sufficient reaction time for protecting the resources of the IHS 100. In one embodiment, the timer value is set to approximately 15.0 seconds. In another embodiment, the timer value is varied using a random delay function for purposes such as reducing the ability to spoof the watchdog messages transmitted by the coprocessor 204.

The controller chip 206 then waits to determine if a watchdog message is received from the coprocessor 204 at step 404. If so, processing continues at step 402; otherwise, processing continues at step 406 to determine whether or not the timer has expired. When the watchdog message is received, the controller chip 206 may verify that the bitmask field of the received watchdog message is populated with a numerical value that is incremented from the previously received watchdog message. In one embodiment, the bitmask field may be configured with a maximum value (e.g., 0x80), such that when generated by the coprocessor 204, the next valid bitmask field can be truncated to a minimum value (e.g., 0x00) so that the bitmask field can be again incremented each time the watchdog message is generated and transmitted.

At step 406, the controller chip 206 determines whether or not the timer has expired. In general, expiration of the timer is construed to mean that the coprocessor 204 is no longer executing its routines properly (e.g., failed sanity check). In one embodiment, the coprocessor 204 may include executable code to only send the watchdog message if its executable code has not been tampered with. That is, the coprocessor 204 may examine its own portion of code stored in memory, such as using a cyclic redundancy check (CRC) process to verify that it has not been tampered with, and only send the watchdog message if so. If the timer has not expired, processing continues at step 404; otherwise, the coprocessor 204 is considered to be compromised in which processing continues at step 408.

At step 408, the controller chip 206 places the BMC 132 in a failsafe mode of operation. In general, the failsafe mode of operation is intended to perform certain actions to ensure that the IHS 100 can continue to function properly regardless of how the BMC 132 is performing. For example, the controller chip 206 may communicate with the fan controllers 208 to set the fans at their maximum operating speed when in the failsafe mode of operation. As another example, the controller chip 206 may inhibit further write sequences to the BMC memory 212. As yet another example, the controller chip 206 may lock the BIOS of the IHS in a user input mode so that user input of the alert condition is required when the IHS 100 is re-started.

At step 410, the BMC 132 is rebooted. For example, the BMC 132 SoC 216 may be re-started to remediate the failed condition of the baseboard processor 202 such that processing continues at step 402 to again initialize the watchdog timer of the controller chip 206. In some embodiments, the controller chip 206 may hold the baseboard processor in a reset condition when in the failsafe mode of operation. For example, the controller chip 206 may include logic for, when the SoC 216 has been re-started at an excessive rate (e.g., greater than 3 restarts over a running 10 minute period of time), alerting the BIOS 110 of the excessive re-start condition, and locking the baseboard processor 202 in the reset condition.

The method 400 described above is repeatedly performed throughout the usage of the custom BMC firmware stack 220 on the BMC 132. Nevertheless, when use of the method 400 is no longer needed or desired, the process 400 ends.

Although FIG. 4 describes one example of a method that may be performed to monitor the BMC 132 during use of a custom BMC firmware stack 220, the features of the disclosed process may be embodied in other specific forms without deviating from the spirit and scope of the present disclosure. For example, the method 400 may perform additional, fewer, or different operations than those operations as described in the present example. As another example, although the method 400 describes the use of the controller chip 206 for managing the watchdog timer process, it is contemplated that any suitable processing system may be used, such as by one or more processors of the IHS 100.

It should be understood that various operations described herein may be implemented in software or software modules executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements that such terms describe. Thus, these terms are not necessarily intended to indicate temporal or other prioritization of such elements. The terms "coupled" or "operably coupled"

are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a plurality of hardware and software resources; and
a Baseboard Management Controller (BMC) in communication with the plurality of resources, the BMC comprising:
a first processor configured to execute first instructions stored in a first memory unit to:
execute a custom BMC firmware stack; and
transmit a watchdog message at an ongoing basis; and
a second processor configured to execute second instructions stored in a second memory unit to:
receive the watchdog message;
when the watchdog message is received within a specified elapsed period of time, allow continued operation of the custom BMC firmware stack; and
when the watchdog message is not received within a specified elapsed period of time, place the BMC in a failsafe mode of operation.

2. The IHS of claim 1, further comprising a system on chip (SoC) device comprising the first processor and a third processor, wherein the third processor is configured to execute third instructions stored in a third memory unit to:
assist the first processor in performing one or more functions associated with the operation of the BMC; and
transmit the watchdog message.

3. The IHS of claim 2, wherein the second instructions are further executed to transmit the watchdog message only when the second instructions have not been tampered with via execution of the custom BMC firmware stack.

4. The IHS of claim 2, wherein the second instructions are further executed to:
receive a request for data from a fourth memory unit of the BMC by one of the resources;
inhibit the first processor from responding to the request; and
respond to the request by controlling the third processor to transmit the requested data to the one resource.

5. The IHS of claim 1, wherein the first instructions are further executed to include a numerical value in the watchdog timer, the numerical value incremented each time the watchdog message is transmitted, and wherein the second instructions are further executed to:
when the received watchdog message includes the incremented numerical value, allow continued operation of the first and second processors; and
when the received watchdog message does not include the incremented numerical value, place the first processor in the failsafe mode of operation.

6. The IHS of claim 1, wherein the first instructions are further executed to transmit the watchdog message using a random delay function.

7. The IHS of claim 1, wherein the second instructions are further executed to inhibit the first and second memory units from being written to when in the failsafe mode of operation.

8. The IHS of claim 1, wherein the second instructions are further executed to set one or more fans of the IHS to a maximum speed when in the failsafe mode of operation.

9. The IHS of claim 1, wherein the second instructions are further executed to inhibit execution of the custom BMC firmware stack by holding the first processor in a reset condition when in the failsafe mode of operation.

10. The IHS of claim 1, wherein the second instructions are further executed to place the BMC in a failsafe mode by locking a BIOS of the IHS in a user input mode.

11. A method comprising:
executing a custom baseboard management controller (BMC) firmware stack using first instructions stored in at least one memory and executed by a first processor, wherein the BMC is in communication with a plurality of resources of an information handling system (IHS);
transmitting, using the first instructions, a watchdog message at an ongoing basis;
receiving the watchdog messages using second instructions stored in at least one memory and executed by a second processor;
when the watchdog message is received within a specified elapsed period of time, allowing, using the second instructions, continued operation of the custom BMC firmware stack; and
when the watchdog message is not received within a specified elapsed period of time, placing, using the second instructions, the BMC in a failsafe mode of operation.

12. The method of claim 11, wherein a system on chip (SoC) device comprises the first processor and a third processor, the method further comprising:
assisting, using third instructions stored in a third memory unit and executed by the third processor, the first processor in performing one or more functions associated with the operation of the BMC; and
transmitting, using the third instructions, the watchdog message.

13. The method of claim 12, further comprising transmitting, using the second instructions, the watchdog message only when the second instructions have not been tampered with via execution of the custom BMC firmware stack.

14. The method of claim 12, further comprising:
receiving, using the second instructions, a request for data from a fourth memory unit of the BMC by one of the resources;
inhibiting, using the second instructions, the first processor from responding to the request; and
responding, using the second instructions, to the request by controlling the third processor to transmit the requested data to the one resource.

15. The method of claim 11, further comprising:
including, using the first instructions, a numerical value in the watchdog timer, and incrementing the numerical value each time the watchdog message is transmitted;

when the received watchdog message includes the incremented numerical value, allowing continued operation of the first and second processors using the second instructions; and when the received watchdog message does not include the incremented numerical value, placing the first processor in the failsafe mode of operation using the second instructions.

16. The method of claim 11, further comprising transmitting the watchdog message using a random delay function.

17. The method of claim 11, further comprising performing at least one of inhibiting, using the second instructions, the at least one memory from being written to when in the failsafe mode of operation, setting one or more fans of the IHS to a maximum speed when in the failsafe mode of operation, inhibiting execution of the custom BMC firmware stack by holding the first processor in a reset condition when in the failsafe mode of operation, and place the BMC in a failsafe mode by locking a BIOS of the IHS in a user input mode.

18. A baseboard management controller (BMC) in communication with a plurality of resources of an information handling system (IHS), the BMC comprising:
a first processor configured to execute first instructions stored in a first memory unit to:
execute a custom BMC firmware stack; and
transmit a watchdog message at an ongoing basis; and
a second processor is configured to execute second instructions stored in a second memory unit to:
receive the watchdog message;
when the watchdog message is received within a specified elapsed period of time, allow continued operation of the custom BMC firmware stack; and
when the watchdog message is not received within a specified elapsed period of time, place the BMC in a failsafe mode of operation.

19. The BMC of claim 18, further comprising a system on chip (SoC) device comprising the first processor and a third processor, wherein the third processor is configured to execute third instructions stored in a third memory unit to:
assist the first processor in performing one or more functions associated with the operation of the BMC; and
transmit the watchdog message.

20. The BMC of claim 18, wherein the second instructions are further executed to perform at least one of inhibit the first and second memory units from being written to when in the failsafe mode of operation, set one or more fans of the IHS to a maximum speed when in the failsafe mode of operation, inhibit execution of the custom BMC firmware stack by holding the first processor in a reset condition when in the failsafe mode of operation, and place the BMC in a failsafe mode by locking a BIOS of the IHS in a user input mode.

* * * * *